(12) United States Patent
Kitajima et al.

(10) Patent No.: US 11,302,325 B2
(45) Date of Patent: *Apr. 12, 2022

(54) AUTOMATIC DIALOGUE DESIGN

(71) Applicant: Sony Interactive Entertainment Inc., Tokyo (JP)

(72) Inventors: Marie Kitajima, San Mateo, CA (US); Masanori Omote, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 16/843,799

(22) Filed: Apr. 8, 2020

(65) Prior Publication Data
US 2020/0234710 A1    Jul. 23, 2020

Related U.S. Application Data

(63) Continuation of application No. 15/833,762, filed on Dec. 6, 2017, now Pat. No. 10,636,419.

(51) Int. Cl.
| | |
|---|---|
| *G10L 15/22* | (2006.01) |
| *G10L 15/08* | (2006.01) |
| *G06F 3/16* | (2006.01) |

(52) U.S. Cl.
CPC ............. *G10L 15/22* (2013.01); *G06F 3/167* (2013.01); *G10L 15/08* (2013.01); *G10L 2015/088* (2013.01); *G10L 2015/223* (2013.01)

(58) Field of Classification Search
CPC ......... G10L 17/00; G10L 25/00; G10L 21/00; G10L 15/22; G10L 15/08
See application file for complete search history.

(56) References Cited

U.S. PATENT DOCUMENTS

| | | | |
|---|---|---|---|
| 5,794,204 A * | 8/1998 | Miyazawa | G10L 15/075 704/244 |
| 9,031,293 B2 | 5/2015 | Kalinli-Akbacak | |
| 9,129,602 B1 * | 9/2015 | Shepard | G10L 21/013 |
| 9,298,977 B2 | 3/2016 | Rekimto et al. | |
| 9,774,690 B2 | 9/2017 | Sano et al. | |
| 9,798,920 B2 | 10/2017 | Ohba et al. | |
| 10,096,319 B1 * | 10/2018 | Jin | G10L 25/66 |
| 10,636,419 B2 * | 4/2020 | Kitajima | G10L 15/22 |
| 2008/0109475 A1 * | 5/2008 | Burmester | G06F 11/3672 |
| 2011/0134026 A1 * | 6/2011 | Kang | G10L 17/26 345/156 |
| 2013/0265226 A1 * | 10/2013 | Park | H04N 21/485 345/156 |
| 2014/0025383 A1 * | 1/2014 | Dai | G10L 25/63 704/260 |
| 2015/0346845 A1 * | 12/2015 | Di Censo | G06F 3/013 707/766 |

(Continued)

*Primary Examiner* — Shreyans A Patel
(74) *Attorney, Agent, or Firm* — John L. Rogitz

(57) ABSTRACT

A chatbot learns a person's related "intents" when asking for information and thereafter, in response to an initial query, which the chatbot answers, the chatbot generates a secondary dialogue, either providing the person with additional information or inquiring as to whether the person wishes to know more about a subject. The chatbot may use an external trigger such as time, event, etc. and automatically generate a query or give information to the person without any initial query from the person.

19 Claims, 6 Drawing Sheets

(56) References Cited

U.S. PATENT DOCUMENTS

2016/0163332 A1\* 6/2016 Un ................... G06F 16/90332
                                                              704/260
2017/0004396 A1\* 1/2017 Ghotbi ................. G06N 3/006
2017/0206915 A1\* 7/2017 Prasad ................... G10L 25/63

\* cited by examiner

AUTOMATIC DIALOGUE DESIGN

FIELD

The application relates generally to chatbots automatically designing dialogs.

BACKGROUND

Apple Siri®, Microsoft Cortana®, Google Assistant®, Amazon Alexa™ and Line Corporation Clova™ are examples of "chatbots" that audibly respond to spoken queries from people to return answers to the queries. The term "chatbot or bot" as used herein refers to a program (or the entire system including it) that performs dialogue communication on behalf of humans. A dialogue may be a combination of an utterance (such as a query) from a person and a response from the chatbot to the utterance. The intent of the dialogue in these systems is that initiated by the person and is based on the subject of the utterance. In this context, "intent" refers to categorizing what kind of intention the utterance of the person has. The chatbot responds to the person-defined intent appropriately. To this end, "entity" refers to categorizing meaningful words in a person's utterance after recognizing the person's intent.

SUMMARY

As understood herein, the intent of a dialogue helpfully may be preemptively established by the chatbot instead of the person, to better assist the person in obtaining possibly relevant, interesting, or important information.

Accordingly, a device includes at least one computer memory that is not a transitory signal and that comprises instructions executable by at least one processor to receive an utterance from a person. The instructions are executable to access a data structure based on the utterance to retrieve a response to the utterance and to display the response. The instructions further are executable to, based at least in part on the utterance, generate a secondary dialog and automatically play the secondary dialogue without any further prompt from the person apart from the utterance.

In example embodiments, the response is audibly displayed, in which case the device can include one or more speakers for playing the response. In addition, or alternatively, the response may be visibly displayed, in which case the device can include one or more displays for presenting the response.

In some implementations, the instructions may be executable to correlate utterances from the person to generate a data structure of learned correlations, and to generate the secondary dialogue based at least in part on the learned correlations. In example embodiments, the instructions can be executable to identify at least one trigger that is not based on an utterance by the person, and to, responsive to the trigger, generate the secondary dialogue.

In another aspect, an apparatus includes at least one processor and at least one computer storage with instructions executable by the processor to receive a trigger generated by a person. The instructions are executable to access a data structure based on the trigger to retrieve a response to the trigger, and to display the response. The instructions are further executable to generate a secondary dialogue and to automatically play the secondary dialogue without any further prompt from the person apart from the trigger.

In another aspect, a method includes receiving a trigger generated by a person, accessing a data structure based on the trigger to retrieve a response to the trigger, and displaying the response. The method also includes generating a secondary dialogue and automatically playing the secondary dialogue without any further prompt from the person apart from the trigger.

The details of the present application, both as to its structure and operation, can best be understood in reference to the accompanying drawings, in which like reference numerals refer to like parts, and in which:

BRIEF DESCRIPTION OF THE DRAWINGS

FIG. 1A is a schematic diagram of a vehicle (such as a driverless vehicle) embodiment;

DETAILED DESCRIPTION

Figure 1:
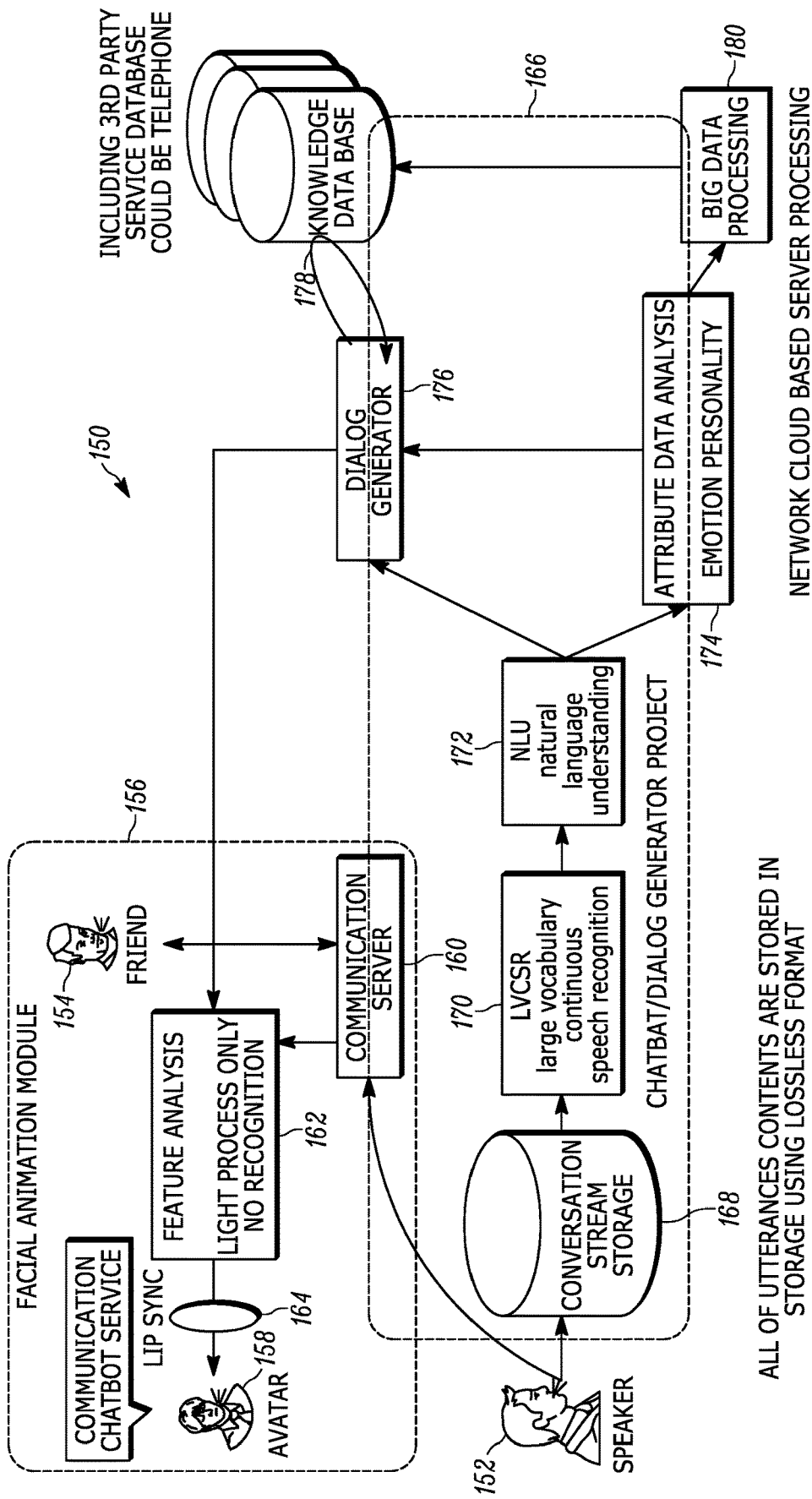
FIG. 1 is a schematic diagram of social service platform consistent with present principles.

This disclosure relates generally to computer ecosystems including aspects of consumer electronics (CE) device networks such as but not limited to distributed computer game networks, video broadcasting, content delivery networks, virtual machines, and machine learning applications. Note that many embodiments of the instant chatbot are envisioned, with several, including driverless vehicles and mobile telephones, described and shown herein.

A system herein may include server and client components, connected over a network such that data may be exchanged between the client and server components. The client components may include one or more computing devices including game consoles such as Sony Play Station® and related motherboards, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

FIG. 1 shows a voice-based social service platform 150 for one or more human users or speakers 152 with one or more respective human friends 154. A facial animation module 156 for animating one or more computer-displayed avatars 158 includes one or more cloud-based servers 160 communicating with one or more feature analysis modules 162 to output lip synchronization information 164 to cause the lips of the avatar 158 to move in synchronization with a chatbot speaking, which is played on audio speakers. Further details of the facial animation module 156 are disclosed in the present assignee's U.S. patent application Ser. No. 15/833,762.

As shown in FIG. 1, the facial animation module 156 overlaps with a chatbot dialogue generator module 166. The chatbot dialogue generator module 166 includes a local or remote (cloud) storage 168 to record and store the voice of the speaker 152. Information from the storage 168 may be processed by a large vocabulary continuous speech recognizer (LVCSR) module 170, which performs speech recognition on the information in the storage 168. The LVCSR module 170 may communicate with a natural language understanding unit (NLU) 172 to derive a meaning from the speech recognized by the LVCSR 170 using, for example, machine learning principles.

In turn, the NLU 172 may communicate with an attribute data analysis engine 174 to derive emotion and personality indicators of the speaker 152 based on the output of the NLU 172. The NLU 172 may also exchange information with a dialogue generator 176 to generate additional or secondary dialogue according to principles discussed further below. The engines and modules in FIG. 1 may provide data to and/or access data in one or more knowledge databases 178 including third party databases (such as hotel and restaurant review services). The engines and modules in FIG. 1 may use processing capability in a network-based big data processing server center 180.

Figure 1A:
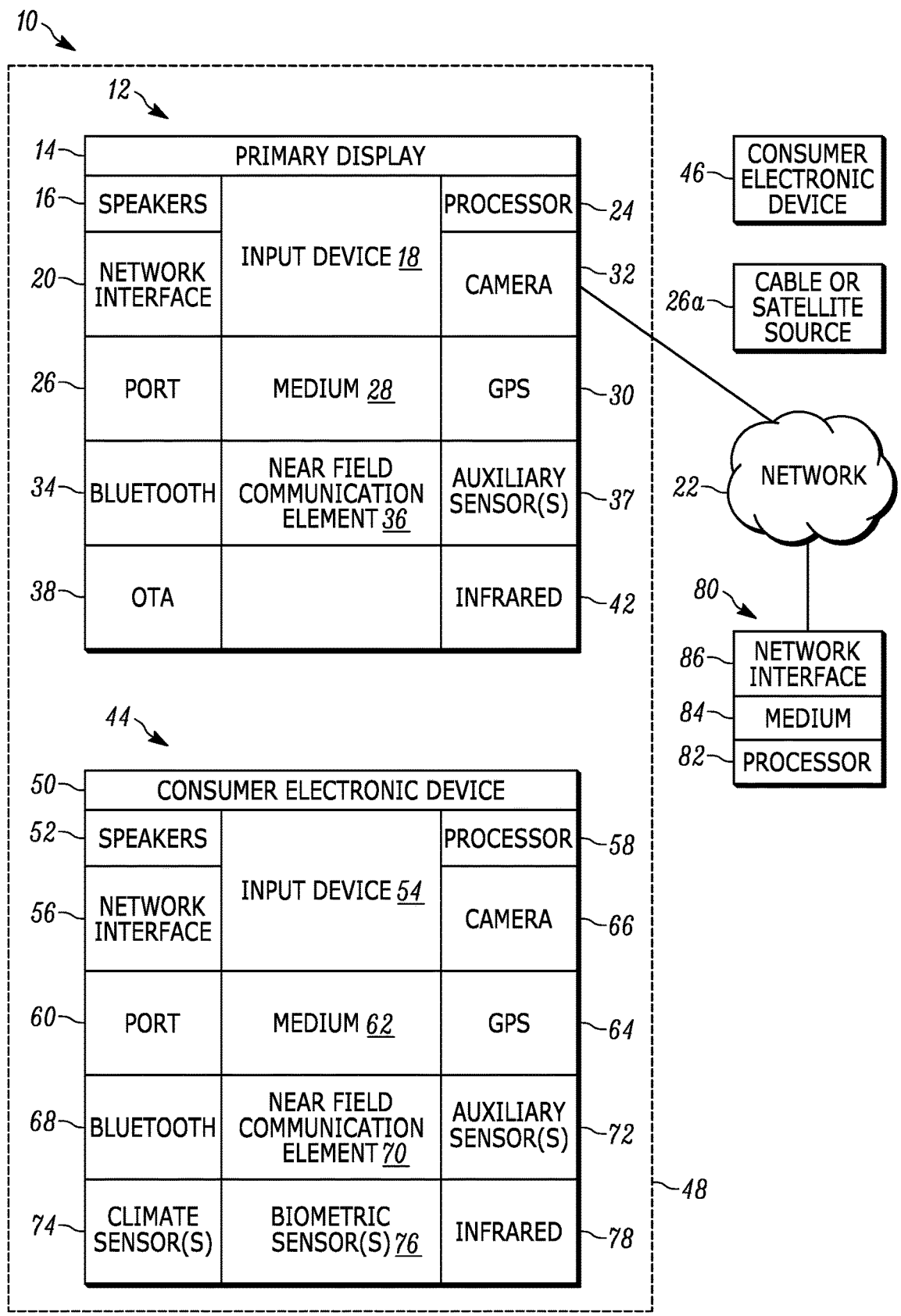
FIG. 1AA is a block diagram of an example system including an example in accordance with present principles.
Figure 1A:
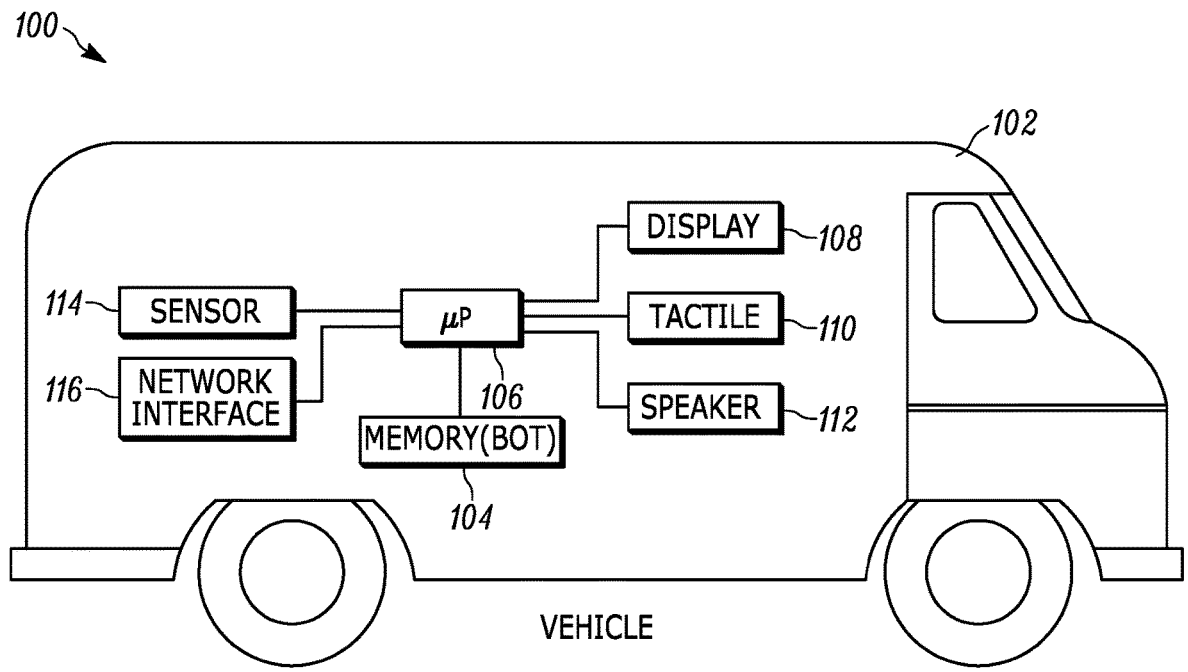

FIG. 1AA shows a system 10 to illustrate example hardware and software components used by the various computer-based components herein shown, and which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1AA. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1AA, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV. A CE device may be established by a digital assistant, an example of which is shown and described further below.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a digital assistant, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1AA over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. The network interface 86 may be a remote direct memory access (RDMA) interface that directly connects the medium 84 to a network such as a so-called "fabric" without passing through the server processor 82. The network may include an Ethernet network and/or Fibre Channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., network gaming applications, digital assistant applications, etc. Or, the server 80 may be implemented by one or more game consoles or other computers in the same room as the other devices shown in FIG. 1AA or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

FIG. 1A shows a specific non-limiting example in which a system 100 includes a vehicle 102 such as a driverless vehicle in which a chatbot application consistent with present principles has been downloaded from the cloud, such as a server 80, onto one or more computer memories 104, which may be implemented by any of the computer storage devices described herein. The chatbot application can be executed by one or more processors 106 to output information as further disclosed below on one or more output devices, including a visual display 108 such as a flat panel display, a tactile signal generator 110 such as a buzzer or other device that generates tactile signals, and one or more audio speakers 112. The processor 106 may receive input from one or more sensors 114 such as microphones, cameras, biometric sensors. The processor 106 may communicate with a network such as the Internet using one or more wired or more typically wireless network interfaces 116 such as but not limited to Wi-Fi.

Figure 1B:
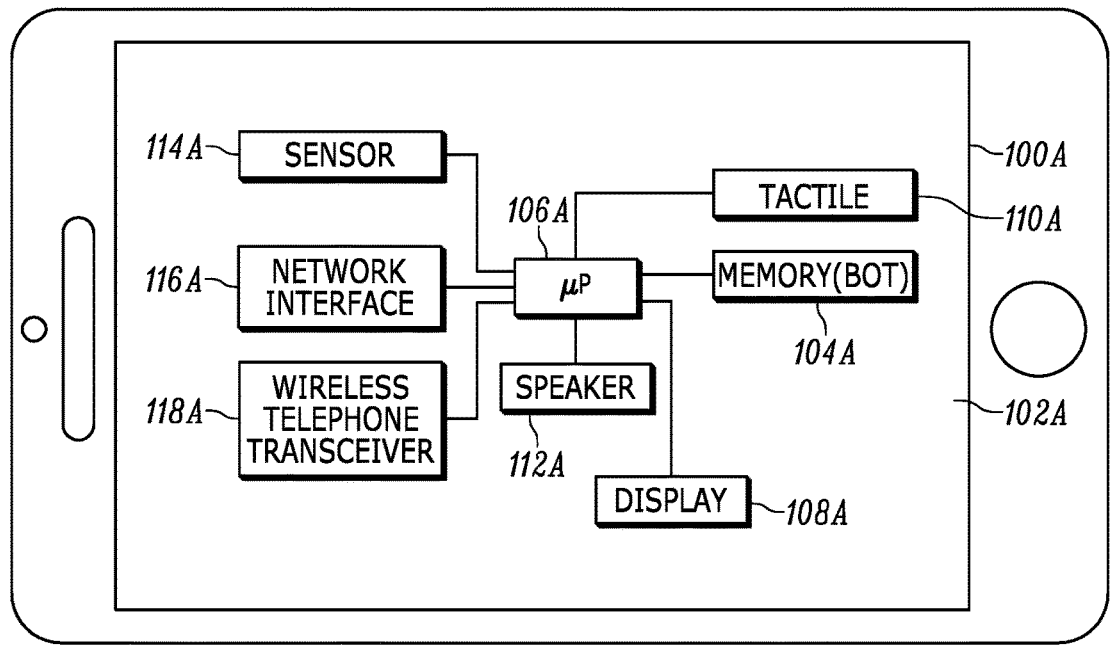
FIG. 1B is a schematic diagram of a mobile communication device (such as a mobile telephone) telephone embodiment.

FIG. 1B shows another specific non-limiting example in which a system 100A includes a mobile communication device (MCD) 102A such as a mobile telephone in which a chatbot application consistent with present principles has been downloaded from the cloud, such as a server 80, onto one or more computer memories 104A, which may be implemented by any of the computer storage devices described herein. The chatbot application can be executed by one or more processors 106A to output information as further disclosed below on one or more output devices, including a visual display 108A such as a flat panel display, a tactile signal generator 110A such as a buzzer or other device that generates tactile signals, and one or more audio speakers 112A. The processor 106A may receive input from one or more sensors 114A such as microphones, cameras, biometric sensors. The processor 106A may communicate with a network such as the Internet using one or more wired or more typically wireless network interfaces 116A such as but not limited to Wi-Fi. The MCD may also include one or more wireless telephony transceivers 118A such as but not limited to code division multiple access (CDMA) transceivers, global system for mobile communication (GSM) transceivers, etc.

Figure 2:
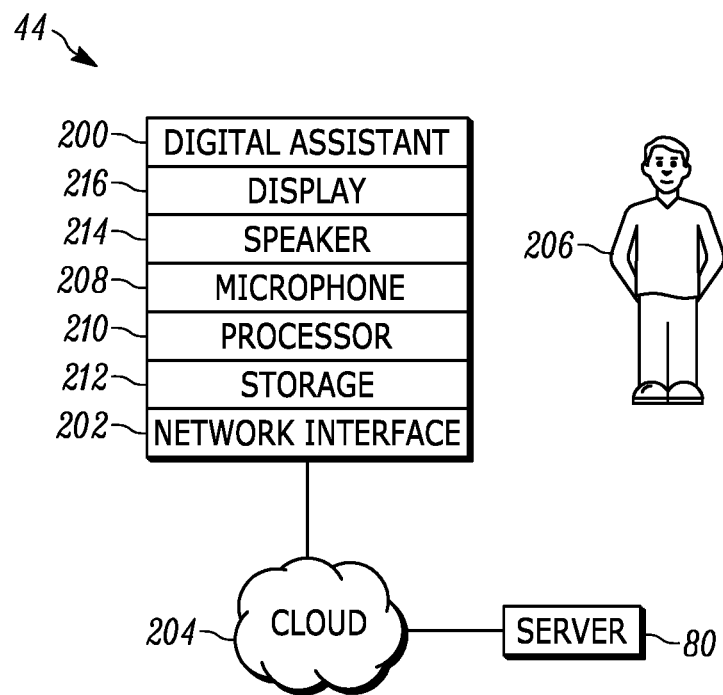
FIG. 2 is a block diagram of an example digital assistant environment.

FIG. 2 illustrates an example application of a CE device 44 implemented by a digital assistant 200 communicating, via a network interface 202 such as a Wi-Fi or other appropriate wired or wireless interface with the Internet 204 and thence with one or more servers 80 to exchange information therewith. A person 206 can speak into a microphone 208 of the digital assistant 200 and the person's voice is digitized for analysis using speech recognition by a processor 210 accessing instructions on a computer memory or storage 212 such as disk-based or solid-state storage. The digital assistant responds to queries from the person 206 by accessing data on the server 80 and/or storage 212 and converting query results to audible signals that are played on one or more speakers 214 and/or presented on one or more visual displays 216.

Figure 3:
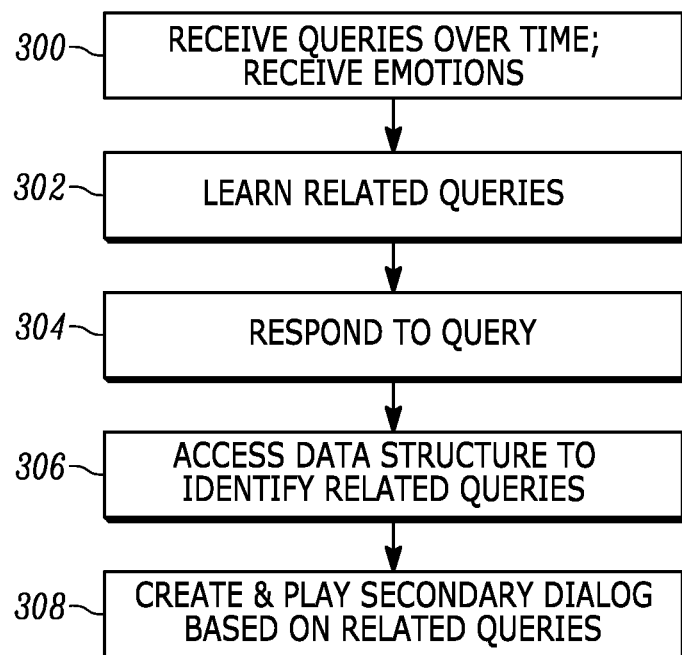
FIG. 3 is a flow chart of example dialogue creation logic.

FIG. 3 illustrates example overall logic consistent with present principles. At block 300, queries or other voice input from the speaker 152 shown in FIG. 1 may be received over time. Concurrent emotions of the speakers, including voice tones, may be received and correlated with the voice input, digitized, and stored locally or remotely on a cloud server.

To determine emotion, images of the speaker may be taken, and facial feature recognition executed on them to correlate the facial features to emotions such as happiness, anger, etc. Other biometric sensors in addition to image recognition of facial features in digital images may be used to determine concurrent emotion of the speaker. U.S. Pat. Nos. 9,798,920, 9,774,690, 9,298,977, and 9,031,293, all incorporated herein by reference and all owned by Sony Corp. or a subsidiary thereof describe various techniques for determining the emotion of a person. In the vehicle example above, driving actions may be correlated to emotion. For instance, a hard-braking action may indicate fear or anger, while a soft braking action may be correlated to a relaxed state or happiness. Similarly, vigorous rotation of the steering wheel or forceful application of the accelerator pedal may indicate tension while slower rotation of the steering wheel and gentle application of the accelerator may be correlated to a relaxed state or happiness. Gaze tracking and rapidity of movements such as in gently or forcefully opening the door and closing the vehicle door may be correlated to tension/relaxation, respectively. Wearable biometric-sensing devices can be used to detect such things as heart rate and perspiration and correlated to emotions of vehicle occupants. For the vehicle implementation of FIG. 1A, the processing device processing voice and emotion signals may be a separate processor in, e.g., a user's mobile telephone, or an onboard computer, or by a processor receiving the information from the vehicle wirelessly using any of the transceivers described herein and executing emotion recognition in the cloud.

Moving to block 302, related queries are learned over time. More particularly, machine learning may be employed to learn queries the user may often link together, with date and time characteristics of the relationships being correlated with the relationships. As an example, if a speaker requests to know the time and then habitually follows up that query with one about the weather, the weather query can be correlated with the time query along with times of day and days of the week the queries typically are related by the user.

Proceeding to block 304, the system implementing the present chatbot responds to a received query and at block 306 uses the query to access a data structure of related queries to identify a related query. When such a related query is identified (at first, default relationships may be used while machine learning is implemented on user queries over time), a secondary dialogue based on the related query is created and played at block 308. For example, in the example above, if the user requests to know the time of day, at block 304 the chatbot may respond with the time of day and then at block 308 the chatbot may ask "would you like to know the weather?" or may preemptively inform the user of the current weather conditions and/or forecast. The secondary dialogue may be based in part on the sensed emotion of the user. For example, if the user is sensed as being tense, a secondary dialogue may be delayed or changed to something relatively anodyne or soothing, such as "it's a beautiful day" in an attempt to calm the user, whereas if the user is sensed as being relaxed, secondary dialogs may be immediately presented even if they require additional attention or response from the user.

While chatbots typically produce audio feedback to the user using speakers 214 as shown in FIG. 1 and in some cases, can present visible responses in displays 216, haptic feedback may also or alternatively be presented as described above in relation to FIGS. 1A and 1B. That is, a secondary dialogue presented at block 308 may be a haptic buzz or other haptic alert that additional information is available if the user would ask, for example. Haptic feedback may be particularly appropriate for the vehicle application of FIG. 1A, and also feedback on an onboard display, through speakers, dashboard displays, car lighting (e.g., changing color to indicate a response or warning), etc. As a safety feature, other vehicle drivers may be signaled using the vehicle's external lamps that the vehicle driver is having a health crisis. Other inputs/factors that a chatbot may consider include temperature, current weather, time of day, day of week, mode of transportation. A plugin/wireless device may be provided for the vehicle to determine the user's driving patterns and determine the relative level of safety of the driving as indicated by speed sensors, force sensors on pedals, rotation sensors on the steering wheel, etc.

In some implementations such as the vehicle implementation of FIG. 1A, instead of a voice input triggering the chatbot and/or instead of secondary dialogue being presented in response to a user-generated initial dialogue, other things could trigger a chatbot, such as a sensor indication that a vehicle door has been opened, a wireless signal from an authorized vehicle key fob has been received (to energize a lamp inside the vehicle, for instance), a seat has been sat in, or identifying that a Wi-Fi or Bluetooth connection has been established with the vehicle. In some implementations, a wakeup word per se need not be used to trigger a chatbot, but rather the chatbot module may listen to conversation and based on the context as output by, e.g., the NCU 172 of FIG. 1, generate a secondary dialogue and play it at block 308 of FIG. 3.

The features of FIGS. 1A and 1B may be combined. For example, a mobile telephone can be used with a vehicle or be carried by the user, and user movement within the vehicle (train, car or airplane) as sensed by, e.g., a GPS receiver or accelerometer in the mobile device may be identified to determine a speed of movement of the user, with slower speeds being correlated to a calm emotion and faster speeds to hurried emotions. The chatbot application accordingly can sense if the user is in a public or private place, so if in a public place for example, to preserve privacy, audio output may be sent to wireless headphones instead of the loudspeakers of the device.

Other secondary dialogs may include presenting a user interface (UI) of mobile telephone traffic accidents on the route the user normally takes to work in the morning. A photograph of a destination may be presented as well as a logo related to the destination. A warning implemented by a flashing light on the mobile device may be used as an advisory to leave earlier based on current traffic conditions.

Dialogue generation may start from knowing it rained, so the chatbot app can determine to output a wakeup signal such as a buzz or audible tone earlier than the user may have set the alarm time to be. The secondary dialogue may preemptively inquire on speakers whether the user wants to send a co-worker notice that the user likely will be late based on the inclement weather.

Emotion as sensed as described above and/or by a drive recorder or electronic on-board recorder in the vehicle may be used to establish a tone of voice or other audible characteristic of how the chatbot responds to queries. If the user speaks slowly, for instance, the chatbot may speak a response at a relatively slow speed to mirror the user, while if the user speaks rapidly, the speech is output by the chatbot at a relatively fast rate. As indicated above, if the user's emotions indicate she is rushed or nervous the chatbot may respond with a slower rate of speech and soft tone to calm the user.

The present chatbot module may be implemented by a CE device embodied as a virtual reality (VR) headset or kiosk in a public place. For a kiosk implementation, if the user speaks her native tongue the chatbot app responds in the user's native tongue even if in a country in which the principal language is not the user's native tongue. If the user wishes for the chatbot app to respond in the language of the country in which the principal language is not the user's native tongue, the chatbot may respond to user input to this end by presenting a response to a query received in the user's native tongue in the (different) language of the local country, e.g., by presenting a text response on a display of a mobile telephone to show to a native of the country, who may thus be better able to help.

Figure 4:
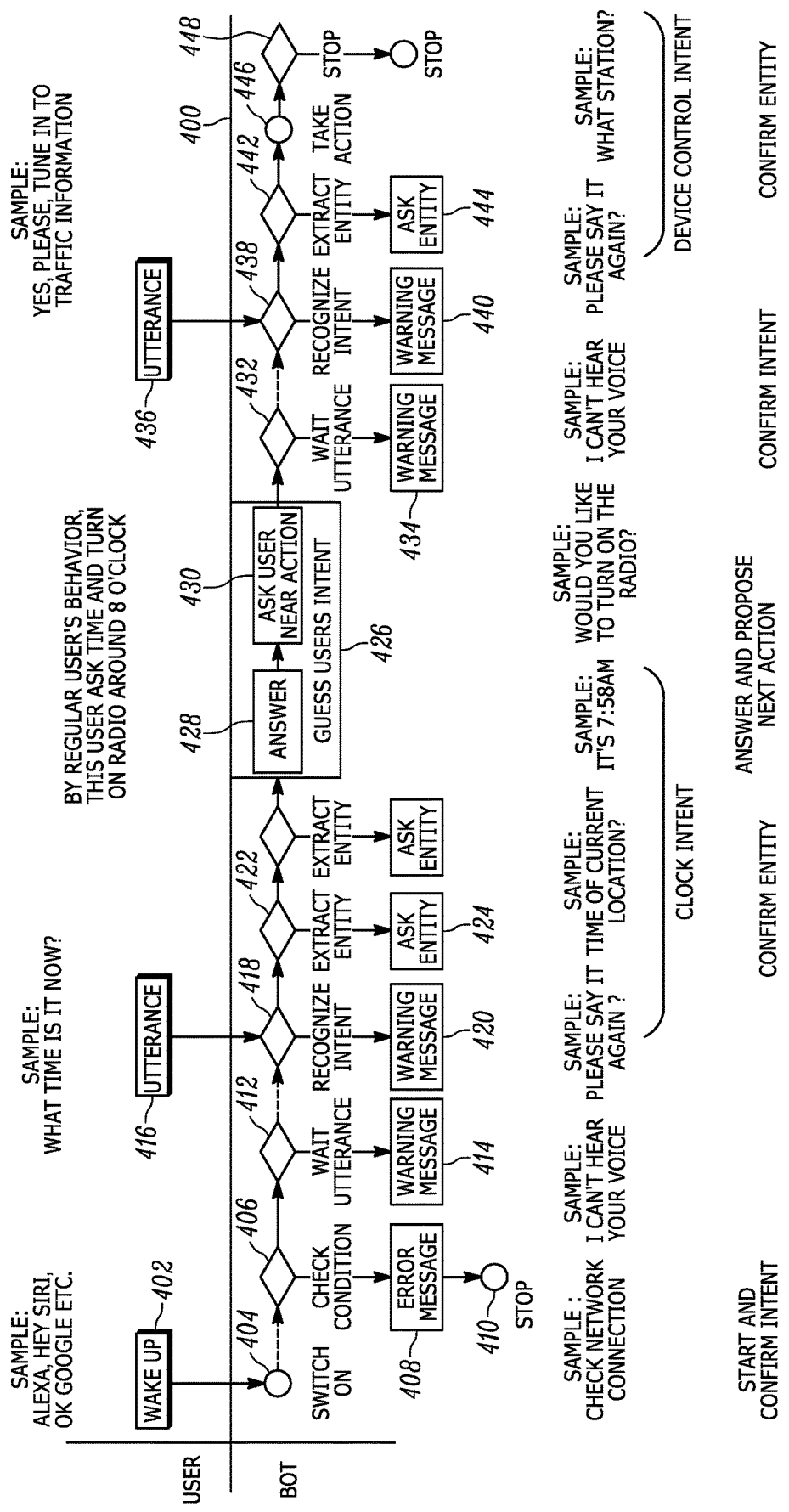
FIG. 4 is a schematic diagram of a time line related to the logic of FIG. 3.

FIG. 4 schematically illustrates a timeline 400 of an example user-chatbot interaction with user input shown above the line 400 and chatbot actions shown below it. A user may enter a wakeup signal 402 (by speaking a wakeup word, by undertaking a predetermined wakeup action, etc.) which enables chatbot response at 404. At 406 the chatbot checks if one or more necessary conditions for interaction are met, e.g., whether a network connection exists, and if a necessary condition is not met an error message 408 is returned and the process may end at 410 with a message such as "check network connection".

If necessary, conditions are met the chatbot waits for a query or other utterance at 412. If no follow-up utterance to the wakeup is received within a timeout period, a warning may be audibly or visibly or tactilely presented on an output device such as any of those described herein at 414. The warning may be a prompt such as "I can't hear you" to alert the user to speak up.

On the other hand, if the user enters, as by speaking, an utterance 416 within the timeout period, the intent of the utterance is recognized by the chatbot app at 418 according to principles discussed above. If no intent is recognized, i.e., the chatbot has no information to give to the user in response to the utterance, a warning message 420 may be presented.

If the intent is recognized, however, one or more entities (e.g., information sources) may be extracted at 422 and queried at 424. For example, a clock entity may be accessed and queried for the time.

Also, at 426 in accordance with principles above additional information including information from the entities 422 may be correlated to the utterance 416 and presented as responses to the query-utterance 416, by responding to the utterance at 428 and/or by posing a secondary question related to the utterance 416 and/or response 428 at 430. As described above, this may be done using machine learning of the user's past behaviors including related utterances to answer the utterance 416 and propose a next action.

Intent may then be confirmed starting at state 432 by awaiting a further utterance from the user. If not received within a timeout period, a warning message may be generated at 434. However, if within the timeout period a secondary user utterance 436 is received, such as a response to the question 428 or next action proposed at 430, the intent of the secondary utterance 436 is recognized (or not) at state 438. If no intent is recognized, i.e., the chatbot has no information to give to the user in response to the utterance or cannot understand the utterance, a warning message 440 may be presented such as "please say again".

If the intent is recognized, however, one or more entities may be extracted at 442 and queried at 444. Action based on information from the entities is then used to take the action required by the secondary utterance 436 at state 446. The logic may then stop at 448.

Figure 5:
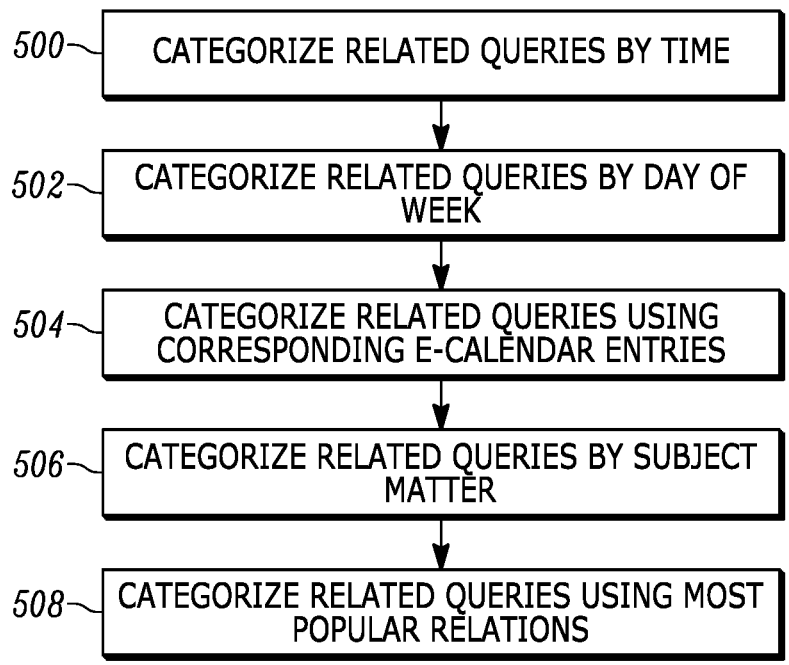
FIG. 5 is a flow chart of example detailed logic for relating queries/"intents"
Figure 6:
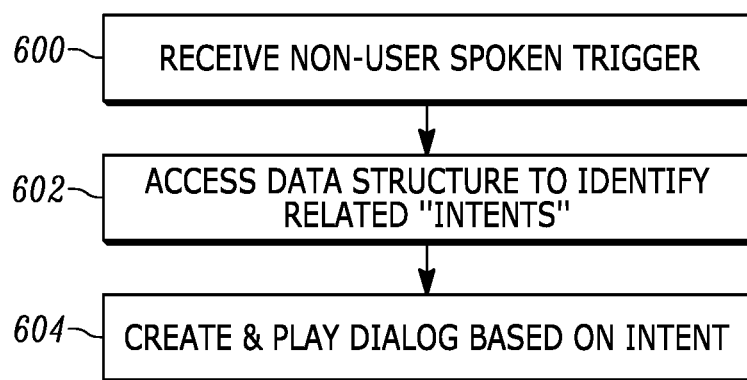
FIG. 6 is a flow chart of example logic for generating a dialogue preemptively without a person first prompting for any information.

FIGS. 5 and 6 illustrate additional logic consistent with present principles. As mentioned above, while logic herein may be shown in flow chart format for illustration purposes in a deterministic and step by step style, in implementation the logic may include other styles such as state logic and/or a Neural Network (NN) which receives the above-discussed input parameters as input, rendering a decision as an output, with the NLU functionality performed within the NN.

At block 500 in FIG. 5, related queries/utterances may be linked together in a data structure and also categorized by time of day. Likewise, related queries/utterances may be categorized at block 502 by day of the week the user's actions typically relate them together. Moreover, at block 504 related queries/utterances can be correlated to entries in the user's e-calendar as may be stored on the user's mobile telephone.

Using, for example, the NLU in FIG. 1, related queries/utterances may be categorized by subject matter at block 506 and ranked at block 508 according to which related queries/utterances are most popular with other users.

Then, at FIG. 6 a trigger may be received such as any of the non-verbal triggers mentioned above. However, the trigger may also be verbal consistent with present principles.

Proceeding to block 602, a data structure of related queries/utterances established according to FIG. 5 in one example may be accessed to determine related "intents" of the user. At block 604 a dialogue may be created and played based on the related intents on a speaker and/or visual display and/or haptic generator.

It will be appreciated that whilst present principals have been described with reference to some example embodiments, these are not intended to be limiting, and that various alternative arrangements may be used to implement the subject matter claimed herein.

What is claimed is:

1. A device comprising:
at least one processor configured with instructions to:
receive an utterance;
identify an emotion based at least in part on the utterance;
identify a tone of voice, a rate of speech, or both a tone of voice and a rate of speech based at least in part on the emotion; and
display a response to the utterance using the tone of voice, the rate of speech, or both the tone of voice and rate of speech.

2. The device of claim 1, comprising at least one speaker for playing the response.

3. The device of claim 1, wherein the response is visibly displayed.

4. The device of claim 3, comprising at least one display for presenting the response.

5. The device of claim 1, wherein the response is audibly displayed.

6. The device of claim 1, wherein the instructions are executable to:
correlate utterances from the person to generate a data structure of learned correlations; and
generate a secondary dialogue to display after displaying the response based at least in part on the learned correlations.

7. The device of claim 1, wherein the instructions are executable to:
identify at least one trigger that is not based on an utterance by the person; and
responsive to the trigger, generate a secondary dialogue to display after displaying the response.

8. An apparatus, comprising:
at least one processor configured with instructions executable by the at least one processor to:
receive an utterance;
identify an emotion based at least in part on the utterance;
based at least in part on the emotion, identify a tone of voice, a rate of speech, or both a tone of voice and a rate of speech; and
display the response to the utterance using the tone of voice, the rate of speech, or both the tone of voice and rate of speech.

9. The apparatus of claim 8, wherein a trigger associated with the utterance comprises an action related to a vehicle.

10. The apparatus of claim 8, wherein the instructions are executable to:
generate a secondary dialogue based at least in part on the emotion; and
automatically play the secondary dialogue without any further prompt from the person apart from the utterance.

11. The apparatus of claim 10, comprising at least one speaker for playing the response.

12. The apparatus of claim 8, wherein the response is visibly displayed.

13. The apparatus of claim 12, comprising at least one display for presenting the response.

14. The apparatus of claim 8, wherein the instructions are executable to:
correlate utterances from the person to generate a data structure of learned correlations; and
generate the secondary dialogue based at least in part on the learned correlations.

15. The apparatus of claim 8, wherein the instructions are executable to:
identify at least one trigger that is not based on an utterance by the person; and
responsive to the trigger, generate the secondary dialogue.

16. A method, comprising:
receiving an utterance from a person;
identifying an emotion of the person based at least in part on the utterance;
identifying a tone of voice, a rate of speech, or both a tone of voice and a rate of speech based at least in part on the emotion; and
using at least one audio speaker, displaying a response to the utterance using the tone of voice, the rate of speech, or both the tone of voice and rate of speech.

17. The method of claim 16, wherein the trigger comprises indication that a vehicle door has been opened.

18. The method of claim 16, wherein the trigger comprises indication that a wireless signal from an authorized vehicle key fob has been received.

19. The method of claim 16, wherein the trigger comprises indication that a wireless connection has been established with a vehicle.

* * * * *